(12) United States Patent
Martens et al.

(10) Patent No.: US 10,768,138 B2
(45) Date of Patent: Sep. 8, 2020

(54) PROTECTING A SUBSTRATE REGION DURING FABRICATION OF A FET SENSOR

(71) Applicant: IMEC VZW, Leuven (BE)

(72) Inventors: Koen Martens, Ghent (BE); Nadine Collaert, Blanden (BE); Eddy Kunnen, Sint-Joris-Winge (BE); Simone Severi, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/228,092

(22) Filed: Dec. 20, 2018

(65) Prior Publication Data

US 2019/0195827 A1 Jun. 27, 2019

(30) Foreign Application Priority Data

Dec. 21, 2017 (EP) .................................... 17209212

(51) Int. Cl.
  *G01N 27/414* (2006.01)
(52) U.S. Cl.
  CPC ..... *G01N 27/4146* (2013.01); *G01N 27/4145* (2013.01)
(58) Field of Classification Search
  None
  See application file for complete search history.

(56) References Cited

U.S. PATENT DOCUMENTS

| | | | |
|---|---|---|---|
| 5,656,128 A * | 8/1997 | Hashimoto | H01L 21/0276 216/47 |
| 8,679,885 B1 | 3/2014 | Cheng et al. | |
| 8,728,844 B1 | 5/2014 | Liu et al. | |
| 9,140,662 B1 | 9/2015 | Carlson et al. | |
| 2002/0111018 A1* | 8/2002 | Tai | H01L 21/28518 438/655 |
| 2005/0051854 A1 | 3/2005 | Cabral, Jr. et al. | |
| 2014/0073039 A1 | 3/2014 | Chang et al. | |
| 2017/0114402 A1 | 4/2017 | Lee et al. | |

OTHER PUBLICATIONS

European Search Report corresponding to European Patent Application No. 17 209 212.4, completed Apr. 3, 2018, 8 pages.

* cited by examiner

*Primary Examiner* — Bo B Jang
(74) *Attorney, Agent, or Firm* — McDonnell Boehnen Hulbert & Berghoff LLP

(57) ABSTRACT

Examples include a method for forming an intermediate in the fabrication of a field-effect transistor sensor, the method comprising: providing a substrate having a substrate region comprising a gate dielectric thereon and optionally a nanocavity therein, providing a sacrificial element over the substrate region, providing one or more layers having a combined thickness of at least 100 nm over the sacrificial element, opening an access to the sacrificial element through the one or more layers, and optionally selectively removing the sacrificial element, thereby opening a sensor cavity over the substrate region; wherein the sacrificial element is removable by oxidation and wherein selectively removing the sacrificial element comprises an oxidative removal.

16 Claims, 11 Drawing Sheets

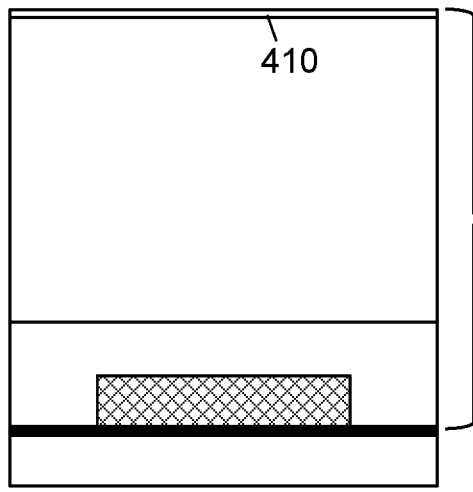
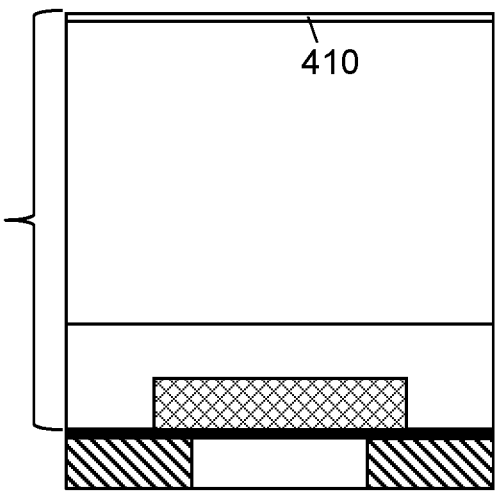
Fig. 3a　　Fig. 3b
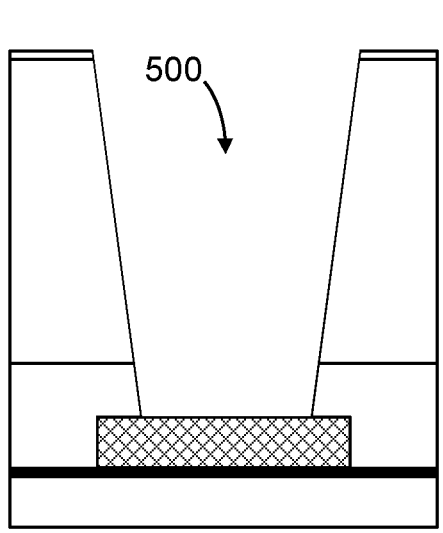
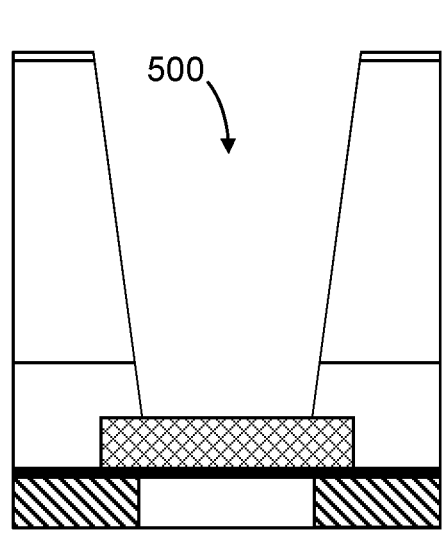
Fig. 4a　　Fig. 4b

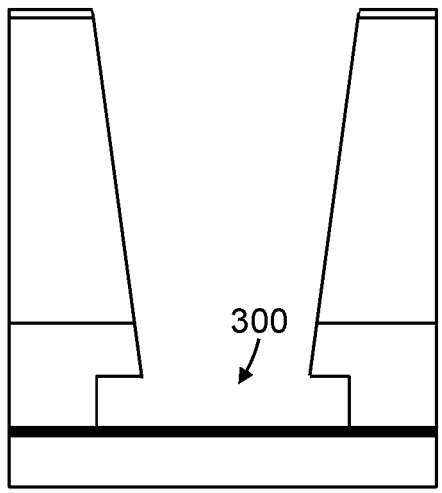
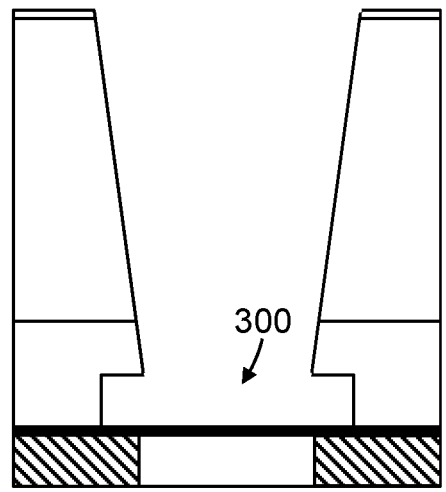
Fig. 5a  Fig. 5b
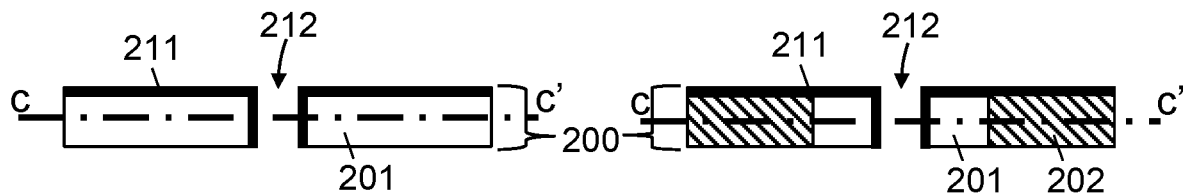
Fig. 6a  Fig. 6b
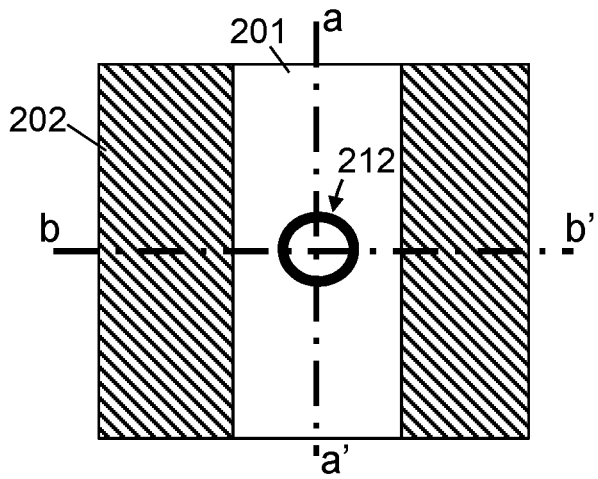
Fig. 6c

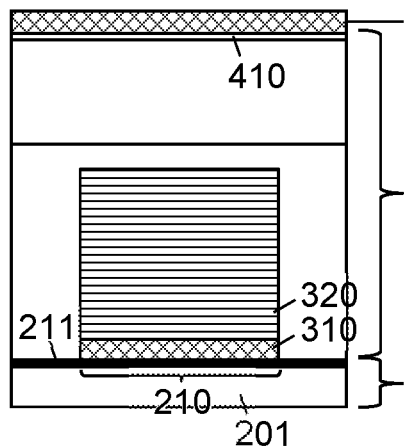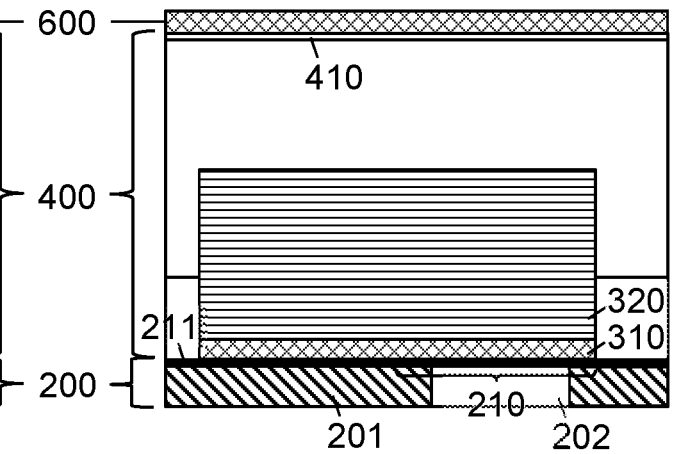
Fig. 17a        Fig. 17b
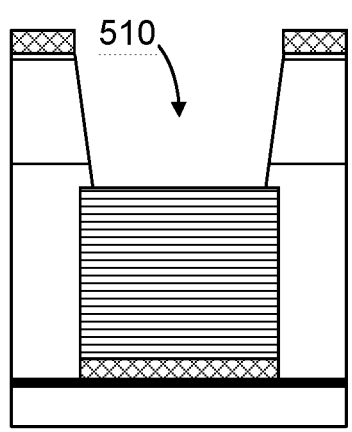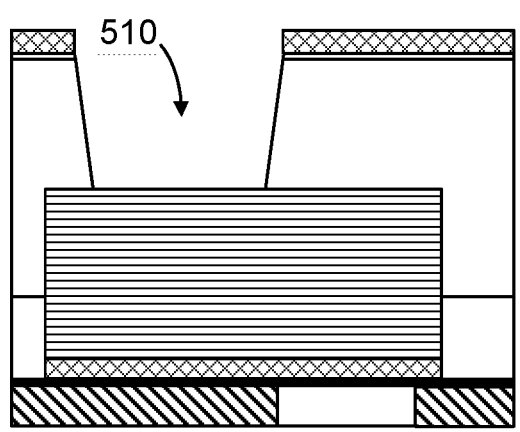
Fig. 18a        Fig. 18b

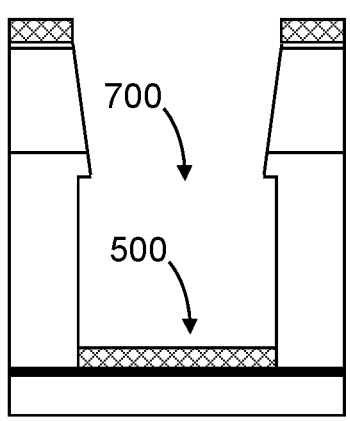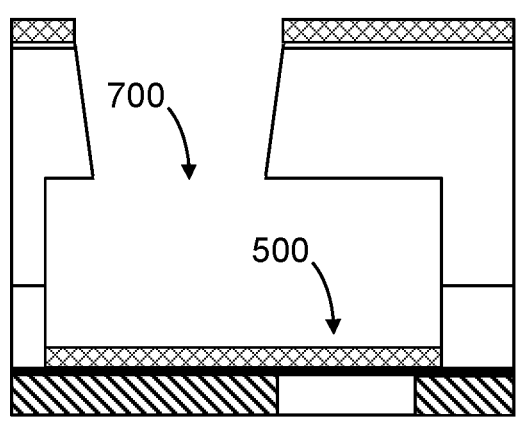
Fig. 19a Fig. 19b
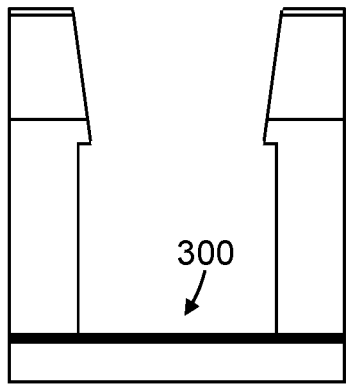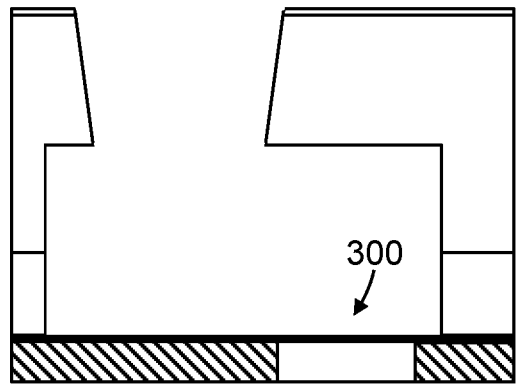
Fig. 20a Fig. 20b

PROTECTING A SUBSTRATE REGION DURING FABRICATION OF A FET SENSOR

CROSS-REFERENCE TO RELATED APPLICATIONS

The present application is a non-provisional patent application claiming priority to European Patent Application No. 17209212.4, filed on Dec. 21, 2017, the contents of which are hereby incorporated by reference.

FIELD OF THE DISCLOSURE

The present disclosure relates to the field of field-effect transistor sensors and more particularly to a fabrication method that can help protect a substrate region.

BACKGROUND

Chemical and/or biological field-effect transistor sensors (FET sensors) having nanometer dimensions typically need to be exposed to an analyte solution (e.g. an electrolyte) so as to enable sensing. In order to protect the sensor FET's gate dielectric during processing, it is often covered by an insulating material. A cavity typically must, therefore, be etched at the end of the manufacturing process to expose the gate dielectric of the FET and allow exposure to the electrolyte. This is a delicate step to perform as making such a cavity at the end of the process typically requires etching down several hundred nanometers or even micrometers deep while stopping on the gate dielectric, which is typically only a few nanometers thick. Additionally, achieving the desired overlay accuracy of the deep etching with respect to the gate dielectric at the end of the manufacturing process is a non-trivial challenge. It is very difficult to meet these requirements with good reproducibility with current manufacturing techniques.

One way to address some of these issues is disclosed in US 20140073039 A1. A method is disclosed comprising forming a plurality of FETs on a semiconductor substrate, wherein a subset of the FETs is for forming biological FETs (BioFETs); forming a poly-silicon sacrificial plug over a portion of the gate electrode for the BioFETs; forming contacts on the FETs; forming a multi-layer interconnect (MLI) over the FETs; etching the MLI to expose at least a portion of the sacrificial plug, thereby forming a portion of a micro well; and removing the sacrificial plug (and optionally the gate electrode) using a non-plasma etch, thereby forming a second well portion of the micro well. The non-plasma etch uses gaseous xenon fluoride ($XeF_2$) as an etchant, or the non-plasma etch is a wet etch based on potassium hydroxide (KOH), tetramethylammonium hydroxide (TMAH), or a hydrofluoric acid/nitric acid/acetic acid mixture (HNA) as etchants. After removal of the sacrificial plug, a partially fabricated BioFET is obtained. Further steps may involve replacement of the gate dielectric in the BioFETs (typically $SiO_2$) by a biologically compatible high k dielectric (e.g. $Si_3N_4$, $Al_2O_3$, $HfO_2$, $TiO_2$ or $Ta_2O_5$). Additional steps may also include coating a sidewall and/or a bottom of the microwell with a first and/or second coating, respectively.

However, several issues remain with this approach. For example, because the BioFETs in US 20140073039 A1 are typically still only partially fabricated, the delicate sensor parts (e.g., gate dielectric) are still prone to be damaged during the multiple process steps that follow the removal of the sacrificial plug. Furthermore, the proposed non-plasma etches (e.g., TMAH based) will typically not only etch poly-silicon, but also other materials such as Al, $Al_2O_3$, Ti, and $Ti_xO_y$. However, it is common for FET sensors to comprise exposed surfaces of these materials, such as Al bond pads and/or $Al_2O_3$ passivation and anti-fouling layers. The disclosed method thus generally requires the sacrificial plug to be removed before exposing these materials, yet further increasing the number of processing steps that may still damage the delicate sensor parts (e.g., gate dielectric).

SUMMARY

Embodiments of the disclosure can provide good intermediates in the fabrication of a field-effect transistor sensor. Embodiments include methods for making the intermediates and for making the final FET sensors.

It is a potential benefit of embodiments of the present disclosure that the substrate region of the intermediate (e.g., with the gate dielectric thereon and optional nanocavity therein) can be well protected during manufacture of the field-effect transistor sensor, but can be easily uncovered later in the fabrication process, e.g., at the very last step thereof. It is a further potential benefit of embodiments of the present disclosure that the substrate region can remain protected substantially throughout the fabrication process and optionally during transport, being uncovered only shortly before use of the field-effect transistor sensor. It is yet a further potential benefit of embodiments of the present disclosure that uncovering the substrate region can be performed by the end-user using relatively safe and inexpensive chemicals and without requiring the end-user to be highly trained.

It is a potential benefit of embodiments of the present disclosure that, even though a relatively thick stack of layers might overlay the substrate region, a sensory cavity exposing the gate dielectric on the substrate region and having critical dimensions too small and a placement (usually referred to as overlay accuracy) too precise to be obtained with typical back end of line processing methods, can be formed.

It is a further potential benefit of embodiments of the present disclosure that the layers overlying the substrate region can be opened down to the sacrificial element using a cruder and/or more aggressive etching technique (e.g., a dry etch), while a finer and/or more selective oxidative technique (e.g., a wet etch) can be used for finally removing the sacrificial element. It is a further potential benefit of embodiments of the present disclosure that the overlay requirements for etching down to the sacrificial element may be reduced when compared to conventional techniques where the formation of a sensory cavity is attempted by directly etching it through the thick stack of layers overlying the gate dielectric. It is yet a further potential benefit of embodiments of the present disclosure that the sacrificial element can act as an etch stop layer for the earlier etching.

It is a potential benefit of embodiments of the present disclosure that the sensor cavity which is left after removing the sacrificial element can remain in a wet state. This potential benefit exists when the oxidative removal is performed with a liquid such as a peroxide solution.

It is a potential benefit of embodiments of the present disclosure that the sacrificial element can be removed selectively with respect to other exposed materials which are commonly present in FET sensors, e.g., after back of line processing of FET sensors. In particular, embodiments of the present disclosure are compatible with causing little to no damage to Al, $Al_2O_3$, Ti, and $Ti_xO_y$. This makes these embodiments of the present disclosure compatible with opening the sensor cavity after Al bond pads have been formed and exposed, or after an $Al_2O_3$ layer (for passivation and/or antifouling) has been formed on top of the device.

It is a potential benefit of embodiments of the present disclosure that long and/or interconnected fluidic channels can be formed in the FET sensor, without damaging the substrate region.

It is a potential benefit of embodiments of the present disclosure that the fabrication of the field-effect transistor sensor is compatible with current complementary metal oxide semiconductor (CMOS) technology, such as high-k CMOS technology.

In a first aspect, the present disclosure relates to an intermediate in the fabrication of a field-effect transistor sensor, comprising: a substrate region comprising a gate dielectric and optionally a nanocavity, a sensor cavity over the substrate region, the sensor cavity being filled with a sacrificial element for protecting the substrate region, one or more layers above the sacrificial element, the one or more layers having a combined thickness of at least 100 nm, and an access (i.e., an opening) opened in the one or more layers, exposing at least part of the sacrificial element; wherein the sacrificial element is removable by oxidation.

In a second aspect, the present disclosure relates to a kit of parts, comprising: the intermediate according to any embodiment of the first aspect, and a peroxide for selectively removing the sacrificial element.

In a third aspect, the present disclosure relates to a method for forming an intermediate in the fabrication of a field-effect transistor sensor, the method comprising: providing a substrate having a substrate region comprising a gate dielectric and optionally a nanocavity, providing a sacrificial element over the substrate region, providing one or more layers having a combined thickness of at least 100 nm over the sacrificial element, opening an access to the sacrificial element through the one or more layers, and optionally selectively removing the sacrificial element, thereby opening a sensor cavity over the substrate region; wherein the sacrificial element is removable by oxidation and wherein, if present, selectively removing the sacrificial element comprises an oxidative removal.

In a fourth aspect, the present disclosure relates to a use of a sacrificial element for protecting a substrate region of a field-effect transistor sensor, the substrate region comprising a gate dielectric and optionally a nanocavity, wherein the sacrificial element is removable by oxidation.

In a fifth aspect, the present disclosure relates to a process for forming a field-effect transistor sensor comprising providing an intermediate according to any embodiment of the first aspect, and selectively removing the sacrificial element by an oxidative removal, thereby opening the sensor cavity over the substrate region.

Aspects of the disclosure are set out in the accompanying independent and dependent claims. Features from the dependent claims may be combined with features of the independent claims and with features of other dependent claims as appropriate and not merely as explicitly set out in the claims.

The above and other characteristics, features and potential benefits of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE FIGURES

The above, as well as additional, features will be better understood through the following illustrative and non-limiting detailed description of example embodiments, with reference to the appended drawings.

FIG. 3a is a schematic cross-section through an intermediate structure related to the fabrication of an FET sensor, according to an embodiment.

FIG. 3b is a schematic cross-section through an intermediate structure related to the fabrication of an FET sensor, according to an embodiment.

FIG. 4a is a schematic cross-section through an intermediate structure related to the fabrication of an FET sensor, according to an embodiment.

FIG. 4b is a schematic cross-section through an intermediate structure related to the fabrication of an FET sensor, according to an embodiment.

FIG. 5a is a schematic cross-section through an intermediate structure related to the fabrication of an FET sensor, according to an embodiment.

FIG. 5b is a schematic cross-section through an intermediate structure related to the fabrication of an FET sensor, according to an embodiment.

FIG. 6a is a schematic cross-section through an intermediate structure related to the fabrication of an FET sensor, according to an embodiment.

FIG. 6b is a schematic cross-section through an intermediate structure related to the fabrication of an FET sensor, according to an embodiment.

FIG. 6c is a schematic cross-section through an intermediate structure related to the fabrication of an FET sensor, according to an embodiment.

FIG. 17a is a schematic cross-section through an intermediate structure related to the fabrication of an FET sensor, according to an embodiment.

FIG. 17b is a schematic cross-section through an intermediate structure related to the fabrication of an FET sensor, according to an embodiment.

FIG. 18a is a schematic cross-section through an intermediate structure related to the fabrication of an FET sensor, according to an embodiment.

FIG. 18b is a schematic cross-section through an intermediate structure related to the fabrication of an FET sensor, according to an embodiment.

FIG. 19a is a schematic cross-section through an intermediate structure related to the fabrication of an FET sensor, according to an embodiment.

FIG. 19b is a schematic cross-section through an intermediate structure related to the fabrication of an FET sensor, according to an embodiment.

FIG. 20a is a schematic cross-section through an intermediate structure related to the fabrication of an FET sensor, according to an embodiment.

FIG. 20b is a schematic cross-section through an intermediate structure related to the fabrication of an FET sensor, according to an embodiment.

Figures 1A, 1B:
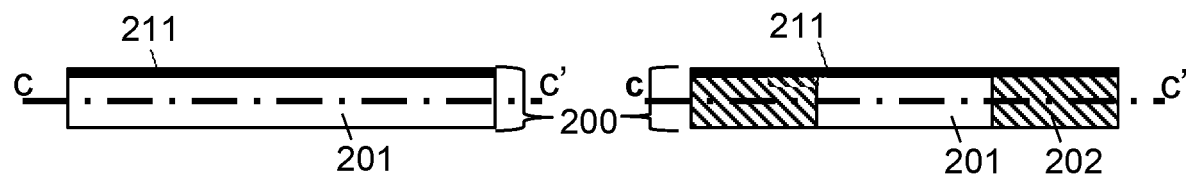
FIG. 1a is a schematic cross-section through an intermediate structure related to the fabrication of an FET sensor, according to an embodiment.
FIG. 1b is a schematic cross-section through an intermediate structure related to the fabrication of an FET sensor, according to an embodiment.

In the different figures, the same reference signs refer to the same or analogous elements.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Reference will be made to transistors. These are usually devices having a first main electrode such as a drain, a second main electrode such as a source, and a control electrode such as a gate for controlling the flow of electrical charges between the first and second main electrodes.

The following terms are provided solely to aid in the understanding of the disclosure.

A nanocavity can be an opening in a layer having at least one dimension ranging from 1 nm to 500 nm, for example, from 1 nm to 100 nm. In some embodiments, all dimensions of the nanocavity range from 1 nm to 500 nm. The nanocavity may, for example, be defined by a width, a length, and a depth, wherein the depth is typically a dimension perpendicular to a surface of the nanocavity-comprising layer. At least one of the width, length, and depth may range from 1 nm to 500 nm, for example, from 1 nm to 100 nm. The nanocavity is not limited in its shape and any cross-section of the nanocavity may have any shape (e.g. triangular, rectangular, square, oval, circular, irregular, etc.). For example, an orifice of the nanocavity, co-planar with a surface of the nanocavity-comprising layer, may have any of the aforementioned shapes. In some embodiments, the nanocavity may have a depth smaller than a thickness of the nanocavity-comprising layer, such that a bottom of the nanocavity is defined within the layer. In other embodiments, the nanocavity may have a depth of 95% of the thickness of the nanocavity-comprising layer, while nevertheless having a closed bottom. In yet other embodiments, the nanocavity may completely cross through the nanocavity-comprising layer, thereby having both a top and a bottom of the nanocavity opening up to the surroundings. Such a nanocavity may also be referred to as a nanopore. Such a nanopore may, for example, open up to the sensor cavity on one side and open up to another fluidic cavity on the opposite side.

As used herein, when a first entity is to be removed selectively with respect to a second entity, this can mean that the first entity is removed faster than the second entity. In some embodiments, the removal process would remove the first entity at least twice as fast, at least five times as fast, or perhaps at least ten times as fast a the second entity. In some embodiments, the second entity may be substantially undisturbed by the removal of the first entity.

In a first aspect, the present disclosure relates to an intermediate in the fabrication of a field-effect transistor sensor (FET sensor), comprising: a substrate region comprising a gate dielectric and optionally a nanocavity, a sensor cavity over the substrate region, the sensor cavity being filled with a sacrificial element for protecting the substrate region, one or more layers above the sacrificial element, the one or more layers having a combined thickness of at least 100 nm, and an access (i.e. an opening) opened in the one or more layers, exposing at least part of the sacrificial element; wherein the sacrificial element is removable by oxidation.

The field-effect transistor sensor may further comprise conventional elements as are well known to the skilled person. The FET sensor may, for example, be formed on a semiconductor substrate (e.g. a Si wafer, a silicon-on-insulator substrate, or an epitaxial stack). The FET sensor may comprise a channel region between a source region and a drain region. The channel region may, for example, have a width and/or length ranging from 1 nm to 10 µm, for example from 5 nm to 1 µm, or from 10 nm to 100 nm. Source and drain contacts may connect to the source and drain regions. The gate dielectric typically covers the channel region and does not cover the source and the drain regions. During operation, an analyte solution may be present in the sensor cavity (e.g. it may contact the gate dielectric) and sensing by the FET sensor may be based on gating of the channel current by the analyte. The sensor cavity is therefore typically a cavity, opening on the gate dielectric, meant to receive an analyte solution, thereby gating the channel. In embodiments, the field-effect transistor sensor may be a chemical sensor, such as a sensor for sensing a chemical (e.g. an ionic species) or for detecting a pH level, and/or it may be a biological sensor, such as a sensor for sensing a particular biomolecule (e.g. a nucleic acid or a protein). A biological sensor may typically be thought of as a specific case of a chemical sensor. In embodiments, the field-effect transistor sensor may be an ion-sensitive field-effect transistor (ISFET) or a field-effect transistor-based biosensor (BioFET). In embodiments, the field-effect transistor sensor may further comprise a nanocavity (e.g. the FET sensor may be a nanocavity-FET) or a nanopore (e.g. the FET sensor may be a nanopore-FET). In embodiments, the channel region may comprise the nanocavity or nanopore. The nanocavity or nanopore is generally formed in the substrate. When present, the nanocavity is in the substrate region, e.g., through the gate dielectric and at least partially through the substrate. When present, the nanopore is in the substrate region, e.g., through the gate dielectric and through the substrate.

The substrate region is typically a region of the substrate comprising elements that are protected during fabrication of the FET sensor, such as the gate dielectric, and the nanocavity if present, particularly when they are exposed by the sensor cavity. These elements are typically relatively delicate structures which are prone to damage or contamination by various further processing steps in the fabrication. In embodiments, the substrate region may be that region of the substrate which is exposed by the sensor cavity. In embodiments, the substrate region may have a width and/or length of from 1 nm to 100 µm, e.g., from 5 nm to 10 µm, or from 10 nm to 1 µm.

In embodiments, the gate dielectric may be formed of $SiO_2$, $SiON$, $Si_3N_4$, $Al_2O_3$, $HfO_2$, $TiO_2$, or $Ta_2O_5$. In embodiments, the gate dielectric may comprise a surface functionalization. A BioFET may, for example, comprise a gate dielectric functionalized with bio-receptors.

Filling the sensor cavity with a sacrificial element can allow for protecting the substrate region (e.g., the gate dielectric and nanocavity, if present) from damage during further processing steps. In this way, it was found that the substrate region may be protected from a relatively early stage in the fabrication process onwards (e.g., soon after forming the gate dielectric and nanocavity, if present) and may later be removed at a relatively late stage in the fabrication process (e.g. right before use). Doing so can allow for protecting the delicate elements throughout the fabrication process. The sacrificial element is an element that fills the sensor cavity and which is meant to be removed before the device can be used. In embodiments, the sacrificial element may comprise a metal, e.g. selected from TiN, W, and TaN, or a carbon-based material, e.g., selected from an amorphous carbon material (such as an advanced patterning film, APF), a graphite, a graphene, a spin-on-carbon, a fullerene containing compound (e.g. a spin-on-carbon comprising fullerene), a polymer, or a photoresist. In alternative embodiments, polymers could be removed with a suitable solvent or a developer and photoresists could be removed with a developer. Amongst carbon-based materials, an amorphous carbon material (such as an advanced patterning film, APF), a graphite, a graphene, a spin-on-carbon, or a fullerene containing compound are often used as they tend to withstand higher temperature (e.g., 400° C. or higher) than polymers and resists.

Metals and carbon-based materials can be oxidatively removed relatively easily and they are generally very heat resistant. In the present disclosure, by oxidative removal it can be meant removal by means of reactive oxygen species. In general, removal methods based on soluble or volatile reactive oxygen species can be used. The oxidative removal may, for example, be achieved using a peroxide-based wet-etching, an oxygen-based plasma etching (cf. infra), wet ozone (e.g., ozone gas mixed with water vapor, typically generated by bubbling ozone gas through hot water), dry ozone (e.g., ozone gas without addition of water vapor), or dry oxidation (where molecular oxygen and heat are applied). A peroxide-based wet-etching or an oxygen-based plasma etching (cf. infra) can be used. Additionally, a peroxide-based wet-etching can be used as it is a low temperature, end-user friendly, and device-friendly method. Indeed, it can be very selective with respect to Al, $Al_2O_3$, $Ti_xO_y$, and Ti.

In embodiments, when the sacrificial element comprises a metal, the oxidative removal, if performed, may comprise a peroxide-based wet etching. Although the other oxidative removal methods cited above can be suitable as well, peroxide-based wet etching is often the most suitable. One possible combination is a metal selected from TiN, W, and TaN, removed with a peroxide (eventually in the presence of exposed Al, $Al_2O_3$, $Ti_xO_y$ or Ti).

In embodiments, when the sacrificial element comprises a carbon-based material, the oxidative removal, if performed, comprises an oxygen-based plasma etching. Although the other oxidative removal methods cited above are suitable as well, oxygen-based plasma etching is often the most efficient for removing carbon-based materials.

In embodiments, the sacrificial element may have a thickness of from 1 nm to 1 µm, e.g. from 10 nm to 500 nm, or from 20 nm to 100 nm.

The further processing steps referred to above typically comprise providing one or more layers, e.g. a back-end-of-line (BEOL) isolation stack, over the sacrificial element.

For instance, after the sacrificial element is formed, and before it is removed, source and drain regions may be defined (by doping) on either side of the sacrificial element, metal contacts (e.g. TiN) may be formed on the source and drain regions, Al pads may be formed on the metal contacts, an isolation stack may be provided over the whole FET and a passivation layer (e.g. $Al_2O_3$) may be provided on top of the isolation stack (with openings through the passivation layer and the isolation stack for accessing the Al pads).

In embodiments, the access to the sacrificial element may be an access suitable for contacting the sacrificial element with an oxidizing agent. In embodiments, the access to the sacrificial element may comprise an opening through the one or more layers. This opening is suitable for introducing the oxidizing agent and for contacting the oxidizing agent with the sacrificial element. In embodiments, the one or more layers may have a combined thickness of at least 100 nm, e.g, at least 500 nm, or at least 1 µm. In embodiments, a dimension of a bottom of the opening (e.g. a width and/or a length) may be smaller than, equal to, or larger than a dimension of a top of the sacrificial structure. Regardless of the dimensions of the opening, the overlay requirements for this opening with respect to the substrate region are in the present disclosure typically reduced, as compared to a case where no sacrificial structure is present and a similar opening is formed for directly uncovering the substrate region. This is because the dimensions and location of the sensor cavity, and thus of the substrate region that is uncovered, are determined by the sacrificial structure (and may thus be defined and fixed early on in the fabrication process, allowing smaller dimensions and a more precise control of location than could be achieved later in the process). It is then sufficient for a bottom of the opening to overlap with a top of the sacrificial structure to such a degree that an access is present to the sacrificial structure for an oxidizing agent to remove the sacrificial structure. Or, alternatively put, it is typically sufficient for a bottom of the opening to overlap with a top of the sensor cavity to such a degree that an analyte solution may enter the sensor cavity. Likewise, in embodiments, the access may be located such that it overlays the substrate region underneath the sacrificial element, but it need not do so. A source and a drain region are typically present on either side of the substrate region and the access to the sacrificial element generally does not overlap with the source and the drain region.

In embodiments, the sensor cavity may have its smallest lateral dimension measuring at most 100 nm and the access may have a dimension, in the direction of the smallest lateral dimension of the cavity, larger than the smallest lateral dimension of the cavity. This can be advantageous because it can allow formation of a very narrow and accurately placed sensor cavity without having to etch the narrow and accurately placed cavity through hundreds of nanometers of overlayers at the end of the manufacturing process. Instead, the small and accurately placed sensor cavity can be formed at an early stage of the fabrication process and an access, which can be less narrow and does not have to be placed as accurately (as long as it overlaps with the sensor cavity), is then etched through the overlayers (e.g., before the formation of source and drain regions).

In embodiments, the sacrificial material being removable by oxidation may comprise the sacrificial material being selectively removable by oxidation with respect to other exposed materials of the intermediate. In embodiments, the intermediate structure may comprise an exposed material selected from Al, $Al_2O_3$, Ti, and $Ti_xO_y$ (e.g., TiO, $TiO_2$, or $Ti_2O_3$) and the sacrificial element may be selectively removable by oxidation with respect to the material. Al is often present as an exposed material in FET sensors in the form of Al bond pads, which may be used for electrically bonding the FET sensor to other components. Likewise, $Al_2O_3$ is a well-liked material for use as a passivation and/or anti-fouling layer, e.g., in the form of a top coating of the FET sensor. It is thus a potential advantage that the sacrificial element in the present disclosure can be removed selectively with respect to these materials, thus allowing them to remain uncovered when doing so; as opposed to requiring additional steps of first covering and later once again uncovering these materials.

In embodiments, a further sacrificial element (i.e., second sacrificial element) may overlay the sacrificial element (i.e., first sacrificial element). In embodiments, the further sacrificial element may be made of amorphous silicon or $Si_3N_4$. The second sacrificial element may perform a similar beneficial function with respect to the first sacrificial element as the first sacrificial element does with respect to the substrate region. That is, the second sacrificial element may protect the first sacrificial element during the further processing steps, and/or it may act as an intermediate etch stop layer when opening the one or more layers over the first sacrificial element, and/or it may reduce the overlay requirements for the opening. In embodiments, the further sacrificial element may have a thickness of from 10 nm to 10 µm, e.g., from 50 nm to 1 µm.

The second sacrificial element may also be used to define a fluidic channel (e.g., a microfluidic channel) in the FET sensor. In embodiments, the intermediate may comprise a fluidic channel (e.g., a microfluidic channel), the fluidic channel being optionally filled with the further sacrificial element. In embodiments, the fluidic channel may have at least one dimension (e.g., a length, a width, or a depth) longer than 1 µm, for example, up to 1 cm. In embodiments, a plurality of fluidic channels may be interconnected.

In embodiments, any feature of any embodiment of the first aspect may independently be correspondingly applied to any embodiment of any other aspect.

In a second aspect, the present disclosure relates to a kit of parts, comprising: the intermediate according to any embodiment of the first aspect, and a peroxide for selectively removing the sacrificial element.

In embodiments, the peroxide may be an aqueous solution. In embodiments, the peroxide solution may comprise up to 31 wt % peroxide, e.g., from 5 to 25 wt %, or from 10 to 20 wt %. In embodiments, the peroxide may be hydrogen peroxide. In embodiments, a temperature of the peroxide may be 40° C. or below, e.g., 25° C. or below, or 10° C. or below. It has been observed that the selectivity of a peroxide-based etch for etching, e.g., TiN with respect to $SiO_2$ may be higher for higher peroxide fractions and/or for lower temperatures. In embodiments, a pH of the peroxide may be from 4 to 8, e.g., from 5 to 7. The pH of the peroxide may, for example, be increased by the addition of $NH_4OH$. The etch selectivity for etching the sacrificial element with respect to a further material may typically be controlled by adjusting the pH of the peroxide, depending on the nature of the materials. Nevertheless, for a certain pH, some exposed materials in the intermediate which are not to be removed may become unstable and may dissolve; for example, $Al_2O_3$ may start to dissolve when the pH is outside the range of about 5 to 7. It may, therefore, in embodiments, be beneficial to avoid such pH values and to keep the peroxide at a pH from 5 to 7.

The peroxide is typically a relatively cheap and a low to moderate risk chemical, particularly in small quantities, and may be safely used even by untrained persons. The kit of parts therefore generally enables the end-user (e.g., a non-specialist) to remove the sacrificial element in the intermediate, thereby uncovering the substrate region, shortly before use of the FET sensor, by simply contacting the peroxide with the intermediate. In this way, the substrate region can remain protected throughout the fabrication of the intermediate and even during transport thereof, thus reducing the risk of damaging the substrate region. Furthermore, after removal of the sacrificial element, the peroxide (e.g., hydrogen peroxide) typically decomposes into water and oxygen. The peroxide can thus be left in contact with FET sensor, i.e., there is typically no need to remove it, or it can be easily diluted and/or washed away. This allows the sensor cavity to be kept in a wet state, thereby e.g. reducing the risk for trapping air bubbles in the FET sensor (e.g. in the sensor cavity) or for damaging the FET sensor (e.g. the substrate region) due to drying out of some of its components.

In some embodiments, the sacrificial element may comprise a metal. In embodiments, the metal may be selected from TiN, W, and TaN.

In embodiments, any feature of any embodiment of the second aspect may independently be as correspondingly described for any embodiment of any other aspect.

In a third aspect, the present disclosure relates to a method for forming an intermediate in the fabrication of a field-effect transistor sensor, the method comprising: providing a substrate having a substrate region comprising a gate dielectric and optionally a nanocavity, providing a sacrificial element over the substrate region, providing one or more layers having a combined thickness of at least 100 nm over the sacrificial element, opening an access to the sacrificial element through the one or more layers, and optionally selectively removing the sacrificial element, thereby opening a sensor cavity over the substrate region; wherein the sacrificial element is removable by oxidation and wherein, if present, selectively removing the sacrificial element comprises an oxidative removal.

In some embodiments, the sacrificial element may comprise a metal and the oxidative removal, if performed, may comprise a peroxide-based wet etching. In embodiments, the metal may be selected from TiN, W, and TaN. In embodiments, the peroxide-based wet etching may comprise the use of a peroxide. In embodiments, the peroxide may be an aqueous solution. In embodiments, the peroxide may comprise up to 31 wt % peroxide, e.g. from 5 to 25 wt % or from 10 to 20 wt %. In embodiments, a pH of the peroxide may be from 5 to 8, e.g., from 5 to 7.

In embodiments, the sacrificial element may comprise a carbon-based material and the oxidative removal, if performed, may comprise an oxygen-based plasma etching.

In embodiments, the carbon-based material may be selected from an amorphous carbon material (such as an advanced patterning film, APF), a graphite, a graphene, or an organic compound (such as a polymer, a spin-on-carbon, or a photoresist).

In embodiments, an act of opening an access to the sacrificial element through the one or more layers may comprise etching an opening that is at least 100 nm deep, e.g., at least 500 nm, or at least 1 μm. In embodiments, the act of opening may comprise a dry etching. Opening the access can be performed using a cruder and/or more aggressive etching technique than the removal of the sacrificial element. This typically allows the opening to be performed relatively quickly and/or relative cheaply, through the bulk thickness of the layers overlying the substrate region, down to the sacrificial element. In embodiments, the opening act may be performed selectively with respect to the sacrificial element. The sacrificial element can thus be used as an etch stop layer for the etching. It is a further potential benefit that the overlay requirements for the etching can be reduced (cf. supra).

Some embodiments may comprise the use of a mask and removal by the same selective removal as the sacrificial element. In embodiments, the mask may comprise a metal (e.g. selected from TiN, W, and TaN) or a carbon-based material (e.g. selected from an amorphous carbon material, a graphite, a graphene, or an organic compound). In embodiments, the mask may comprise a same material as the sacrificial element. It can be beneficial to use a similar material as a mask (e.g. a hardmask) for performing the opening. The mask can then later be readily removed together with the sacrificial element, requiring no additional steps. The mask may for example cover, and thereby protect, an exposed material (e.g. a top coating) which is sensitive to the material removal of the opening step and/or the selective removal step.

The opening step is generally not performed by planarizing the one or more layers until the sacrificial element is exposed but is typically performed by forming an opening through the one or more layers. This opening typically does not overlap with the source and drain regions typically present (and provided between providing the sacrificial element and providing the one or more layers).

In embodiments, the sensor cavity may have its smallest lateral dimension measuring at most 100 nm and the step of opening an access to the sacrificial element may comprise opening an access having a dimension, in the direction of the smallest lateral dimension of the cavity, larger than the smallest lateral dimension of the cavity.

In embodiments, during the selective removal step, the intermediate may comprise an exposed material selected from Al, $Al_2O_3$, Ti, and $Ti_xO_y$ (e.g. TiO, $TiO_2$ or $Ti_2O_3$) and the removal step may be performed selectively with respect to the material.

In embodiments, the method may comprise a further step, after providing the sacrificial element and before providing the one or more layers, of providing a further (i.e. second sacrificial element) over the sacrificial element (i.e. first sacrificial element). Embodiments also include selectively removing the further sacrificial element. In embodiments, the further sacrificial element may comprise an amorphous silicon or a $Si_3N_4$ layer and removing the further sacrificial element may comprise a wet etching (e.g. a phosphoric acid or TMAH based etching) or a dry etching. In embodiments, removing the further sacrificial element may be performed selectively with respect to the sacrificial element (i.e. first sacrificial element).

In embodiments, the further sacrificial element (i.e. second sacrificial element) may define a channel in the intermediate. In embodiments, a fluidic channel may be formed in the intermediate by selectively removing the further sacrificial element. In embodiments, the fluidic channel may have at least one dimension (e.g. a length, a width, or a depth) longer than 1 for example up to 1 cm. In embodiments, a plurality of fluidic channels may be interconnected. While in absence of the first sacrificial element, a good etch selectivity of the second sacrificial element with respect to the gate dielectric can still be achieved (e.g. amorphous silicon or a $Si_3N_4$ can be removed with phosphoric acid or TMAH with a selectivity of 1000/1 versus $SiO_2$), it is nevertheless not typically sufficient to allow fluidic channels longer than 1 μm to be created without damaging the gate dielectric. Conversely, since the substrate region in the present disclosure is protected by the first sacrificial element, long interconnected fluidic channels can be formed upon removing a corresponding second sacrificial material, without the etching reaching down to the gate dielectric. In embodiments, selectively removing the further sacrificial element, thereby forming the fluidic channel, may be performed before or during the opening step. In some embodiments, selectively removing the further sacrificial element, thereby forming the fluidic channel, may be performed before the end of providing the one or more layers. In these embodiments, an access to the fluidic channel may be temporarily sealed (e.g. with a dielectric) and the opening step may comprise removing the temporary seal. In alternative embodiments, selectively removing the further sacrificial element, thereby forming the fluidic channel, may be performed after providing the one or more layers, e.g., as part of the opening step.

In embodiments, prior to providing the sacrificial element, the gate dielectric may be formed of $SiO_2$, $Si_3N_4$, $Al_2O_3$, $HfO_2$, $TiO_2$, and/or $Ta_2O_5$. In embodiments, prior to providing the sacrificial element, the gate dielectric may comprise a surface functionalization (e.g. bio-receptors). In some embodiments, the method may comprise an additional step, after the selective removal step, of replacing a first gate dielectric (e.g. $SiO_2$) by a second gate dielectric. The second gate dielectric may, for example, be a bio-compatible high-k dielectric, e.g. selected from $Si_3N_4$, $Al_2O_3$, $HfO_2$, $TiO_2$, and $Ta_2O_5$. In some embodiments, the method may comprise an additional step, after the selective removal step or after the gate replacing step, of applying a surface functionalization to the gate dielectric (e.g. functionalizing bio-receptors thereto).

In embodiments, any feature of any embodiment of the third aspect may independently be as correspondingly described for any embodiment of any other aspect.

In a fourth aspect, the present disclosure relates to a use of a sacrificial element for protecting a substrate region during fabrication of a field-effect transistor sensor, the substrate region comprising a gate dielectric and optionally a nanocavity, and wherein the sacrificial element is removable by oxidation.

In embodiments, the sacrificial element may be selectively removable by a peroxide-based wet etching or an oxygen-based plasma etching.

In embodiments, any feature of any embodiment of the fourth aspect may independently be as correspondingly described for any embodiment of any other aspect.

In a fifth aspect, the present disclosure relates to a process for forming a field-effect transistor sensor comprising providing an intermediate according to any embodiment of the first aspect, and selectively removing the sacrificial element by an oxidative removal, thereby opening the sensor cavity over the substrate region.

Example 1: Fabrication of a Field-Effect Transistor Sensor

Figure 1C:
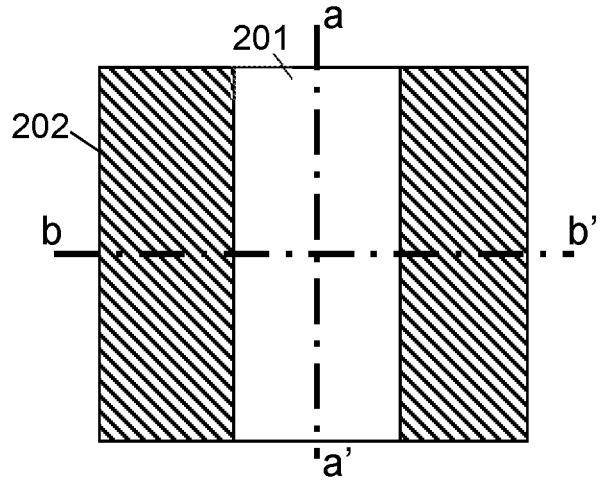
FIG. 1c is a schematic cross-section through an intermediate structure related to the fabrication of an FET sensor, according to an embodiment.

We now refer to FIGS. 1a-c. A substrate (200) is provided comprising a channel region (201) between two source/drain regions (not shown), isolation regions (202) (e.g. a shallow trench isolation, STI) and a gate dielectric (211) over at least the channel region (201); the substrate (200) may further comprise a support layer (not shown) carrying the channel (201), isolation (202) and source/drain regions. In an earlier step, the channel (201), isolation (202) and source/drain regions may, for example, have been formed on or in a semiconductor substrate (e.g. a Si wafer or a silicon-on-insulator substrate). A layer of the gate dielectric (211) (e.g. $SiO_2$) may subsequently have been formed (e.g. conformally) over at least the channel region (201). FIGS. 1a-c show different views of the substrate (200): FIGS. 1a and 1b correspond to two perpendicular vertical cross-sections through the substrate (200), the direction of these cross-sections being indicated in FIG. 1c by the section lines a-a' and b-b' respectively; FIG. 1c corresponds to a horizontal cross-section through the structure, the level of the cross-section being indicated on FIGS. 1a and 1b by the section line c-c'.

Figures 2A, 2B:
FIG. 2a is a schematic cross-section through an intermediate structure related to the fabrication of an FET sensor, according to an embodiment.
FIG. 2b is a schematic cross-section through an intermediate structure related to the fabrication of an FET sensor, according to an embodiment.

We now refer to FIGS. 2a-b. A metal (e.g. TiN) or carbon-based (e.g. APF) sacrificial element (310) is provided over a substrate region (210) (e.g. comprising a part of the gate dielectric (211) overlaying the channel region (201)). The sacrificial element (310) may, for example, be deposited as a layer over the gate dielectric (211) and subsequently lithographically patterned. In FIGS. 2a-b, and all further figures in this example, only the two perpendicular vertical cross-sections are shown, while the horizontal cross-section is omitted.

We now refer to FIGS. 3a-b. The FET sensor is further processed and a plurality of additional layers (400) is thereby formed over the substrate (200) and the sacrificial element (310). These may, for example, comprise a back-end-of-line isolation stack and metallization layers. A film (410) may also be provided over the structure for selective functionalization (e.g. an $Al_2O_3$ layer). The selective functionalization may for example aid with the biocompatibility and/or passivation and/or anti-fouling of the FET sensor.

We now refer to FIGS. 4a-b. An access (500) to the sacrificial element (310) is formed by etching (e.g. by dry etching) an opening through the plurality of additional layers (400); the intermediate (100) is thereby formed. The etching may be a relatively aggressive etching, capable of etching through a thickness of several hundred nanometers of the additional layers (400) in a relatively short time. The sacrificial element (310) may act as an etch stop layer for the etching.

We now refer to FIGS. 5a-b. The sacrificial element (310) is selectively removed by oxidation to open up the sensor cavity (300) over the substrate region (210). The selective oxidative removal may, for example, comprise the use of a peroxide (e.g. an aqueous solution of 20 wt % hydrogen peroxide) or an oxygen-based plasma. In some embodiments, the sacrificial element (310) is removed at the end of the FET sensor fabrication, e.g. shortly before use of the sensor.

Example 2: Fabrication of a Field-Effect Transistor Sensor Comprising a Nanocavity Example 2 is a variation on example 1, wherein the substrate region (210) additionally comprises a nanocavity (212) (e.g. a nanopore).

We now refer to FIGS. 6a-c. A substrate (200) is provided comprising a channel region (201) between two source/drain regions (not shown), isolation regions (202) (e.g. a shallow trench isolation, STI), a nanopore (212) in the channel region (201), and a gate dielectric (211) over at least the channel region (201) and lining the nanopore (212). The substrate (200) may further comprise a support layer (not shown) carrying the channel (201), isolation (202), and source/drain regions. In an earlier step, the channel (201), isolation (202), and source/drain regions may, for example, have been formed on or in a semiconductor substrate (e.g. a Si wafer or a silicon-on-insulator substrate); followed by forming the nanopore (212) in the channel region (201). A layer of the gate dielectric (211) (e.g. $SiO_2$) may subsequently have been formed (e.g. conformally) over at least the channel region (201). FIGS. 6a-c show different views of the substrate (200): FIGS. 6a and 6b correspond to two perpendicular vertical cross-sections through the substrate (200), the direction of these cross-sections being indicated in FIG. 6c by the section lines a-a' and b-b' respectively; FIG. 6c corresponds to a horizontal cross-section through the structure, the level of the cross-section being indicated on FIGS. 6a and 6b by the section line c-c'.

Figure 7A:
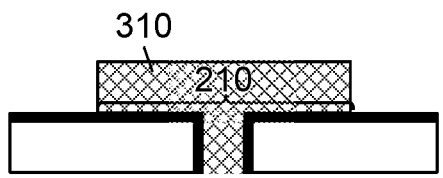
FIG. 7a is a schematic cross-section through an intermediate structure related to the fabrication of an FET sensor, according to an embodiment.
Figure 7B:
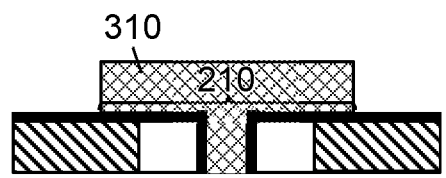
FIG. 7b is a schematic cross-section through an intermediate structure related to the fabrication of an FET sensor, according to an embodiment.

We now refer to FIGS. 7a-b. A metal (e.g. TiN) or carbon-based (e.g. APF) sacrificial element (310) is provided over a substrate region (210) (e.g. comprising a part of the gate dielectric (211) overlaying the channel region (201)) and filling the nanopore (212). The sacrificial element (310) may, for example, be deposited as a layer over the gate dielectric (211) and subsequently lithographically patterned. In FIGS. 7a-b, and all further figures in this example, only the two perpendicular vertical cross-sections are shown, while the horizontal cross-section is omitted.

Figure 8A:
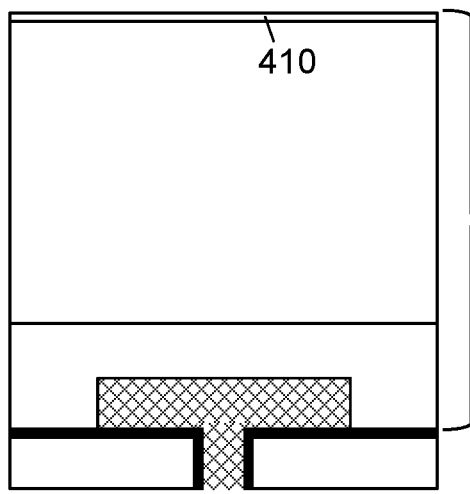
FIG. 8a is a schematic cross-section through an intermediate structure related to the fabrication of an FET sensor, according to an embodiment.
Figure 8B:
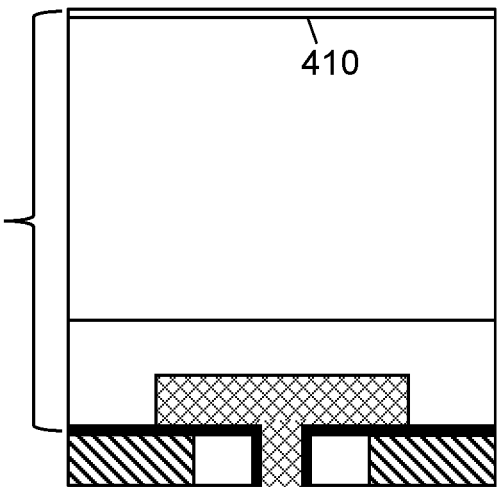
FIG. 8b is a schematic cross-section through an intermediate structure related to the fabrication of an FET sensor, according to an embodiment.

We now refer to FIGS. 8a-b. The FET sensor is further processed and a plurality of additional layers (400) is thereby formed over the substrate (200) and the sacrificial element (310). These may, for example, comprise a back-end-of-line isolation stack and metallization layers. A film (410) may also be provided over the structure for selective functionalization (e.g. an $Al_2O_3$ layer). The selective functionalization may for example aid with the biocompatibility and/or passivation and/or anti-fouling of the FET sensor.

Figure 9A:
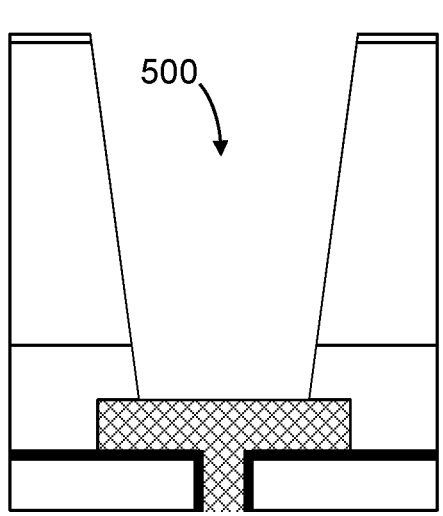
FIG. 9a is a schematic cross-section through an intermediate structure related to the fabrication of an FET sensor, according to an embodiment.
Figure 9B:
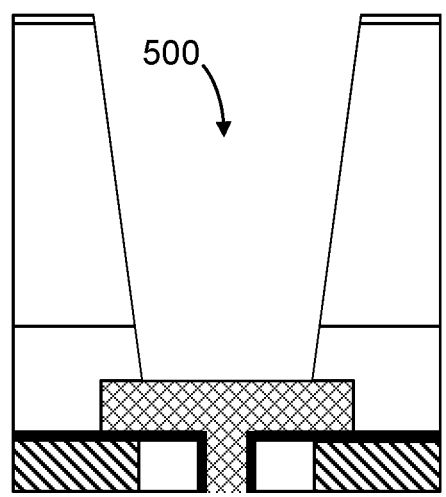
FIG. 9b is a schematic cross-section through an intermediate structure related to the fabrication of an FET sensor, according to an embodiment.

We now refer to FIGS. 9a-b. An access (500) to the sacrificial element (310) is formed by etching (e.g. by dry etching) an opening through the plurality of additional layers (400); the intermediate (100) is thereby formed. The etching may be a relatively aggressive etching, capable of etching through a thickness of several hundred nanometers of the additional layers (400) in a relatively short time. The sacrificial element (310) may act as an etch stop layer for the etching.

Figure 10A:
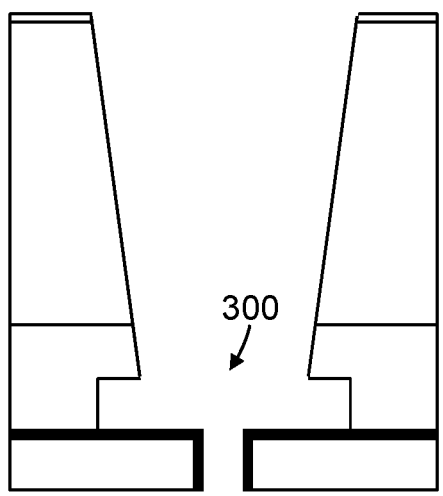
FIG. 10a is a schematic cross-section through an intermediate structure related to the fabrication of an FET sensor, according to an embodiment.
Figure 10B:
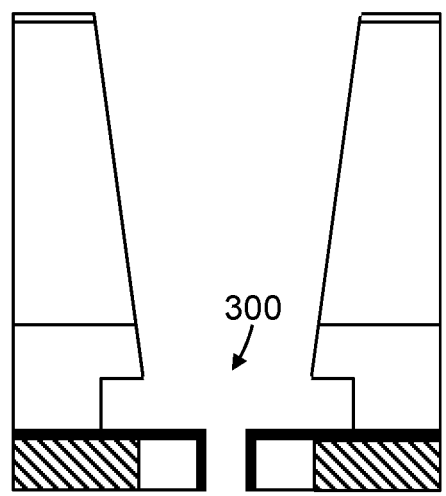
FIG. 10b is a schematic cross-section through an intermediate structure related to the fabrication of an FET sensor, according to an embodiment.

We now refer to FIGS. 10a-b. The sacrificial element (310) is selectively removed by oxidation to open up the sensor cavity (300) over the substrate region (210), including the nanopore (212). The selective oxidative removal may, for example, comprise the use of a peroxide (e.g. an aqueous solution of 20 wt % hydrogen peroxide) or an oxygen-based plasma. In some embodiments, the sacrificial element (310) is formed at the end of the FET sensor fabrication, e.g. shortly before use of the sensor.

Example 3: Fabrication of a Field-Effect Transistor Sensor Using a Mask (600)

Example 3 is a variation on example 1, wherein a mask (600), composed of a similar material as the sacrificial element (310), is used when etching through the plurality of additional layers (400).

The initial steps in the fabrication process are as described in example 1 with respect to FIGS. 1 to 3.

Figures 11A, 11B:
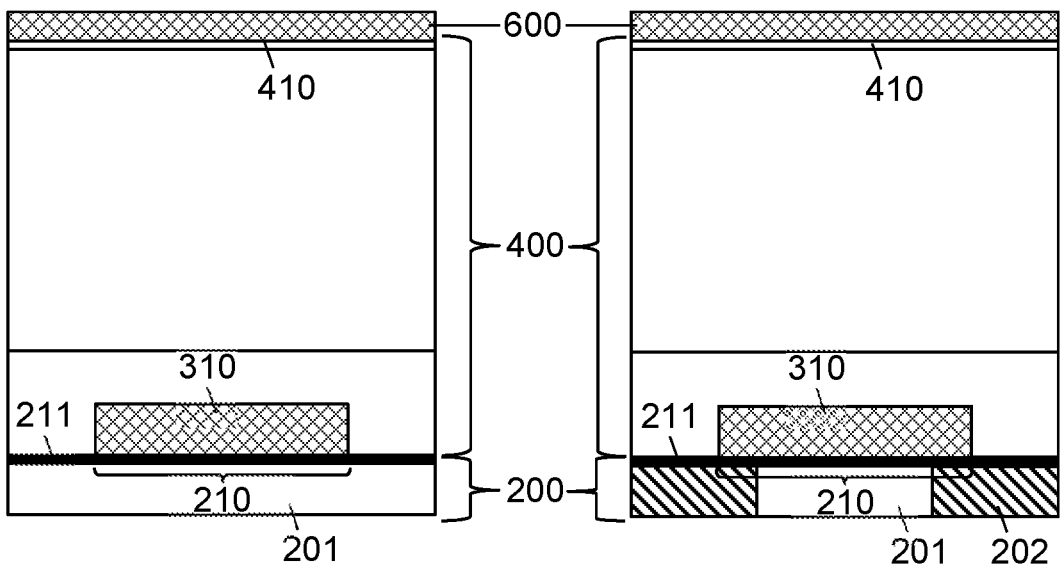
FIG. 11a is a schematic cross-section through an intermediate structure related to the fabrication of an FET sensor, according to an embodiment.
FIG. 11b is a schematic cross-section through an intermediate structure related to the fabrication of an FET sensor, according to an embodiment.

We now refer to FIGS. 11a-b. A layer of a mask (600) is deposited over the plurality of additional layers (400). The mask (600) comprises a similar material as the sacrificial layer, being removable by the same removal technique.

Figures 12A, 12B:
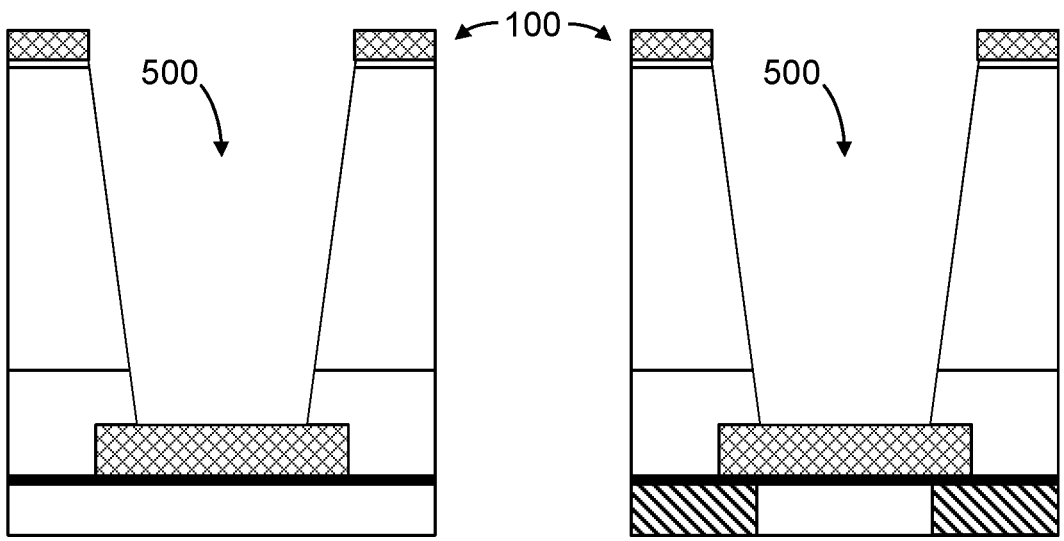
FIG. 12a is a schematic cross-section through an intermediate structure related to the fabrication of an FET sensor, according to an embodiment.
FIG. 12b is a schematic cross-section through an intermediate structure related to the fabrication of an FET sensor, according to an embodiment.

We now refer to FIGS. 12a-b. An opening is made in the mask (600) layer, e.g. using plasma-based etching. Subsequently, an access (500) to the sacrificial element (310) is formed by etching (e.g. by dry etching), using the mask (600), the opening further down through the plurality of additional layers (400); the intermediate (100) is thereby formed. The etching may be a relatively aggressive etching, capable of etching through a thickness of several hundred nanometers of the additional layers (400) in a relatively short time. The sacrificial element (310) may act as an etch stop layer for the etching.

We now refer to FIGS. 5a-b. The sacrificial element (310) is selectively removed by oxidation to open up the sensor cavity (300) over the substrate region (210); the mask (600) is thereby simultaneously removed. The selective oxidative removal may, for example, comprise the use of a peroxide (e.g. an aqueous solution of 20 wt % hydrogen peroxide) or an oxygen-based plasma. In some embodiments, the sacrificial element (310) and mask (600) are removed at the end of the FET sensor fabrication, e.g. shortly before use of the sensor.

Example 4: Fabrication of a Field-Effect Transistor Sensor Using a Further Sacrificial Element (310)

Example 4 is a variation on example 3, wherein also a further, second, sacrificial element (310) is used.

Figures 13A, 13B:
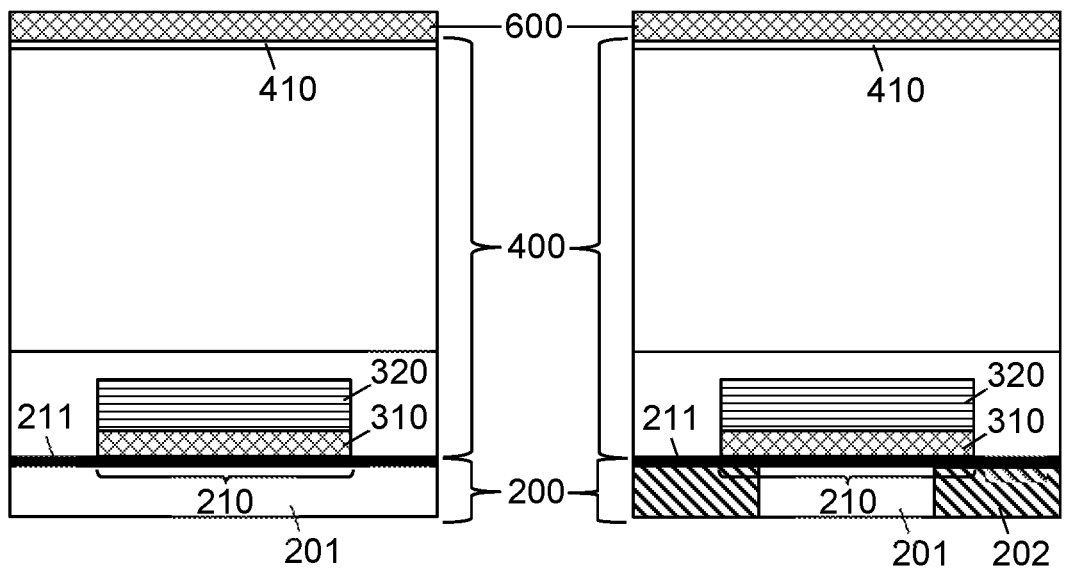
FIG. 13a is a schematic cross-section through an intermediate structure related to the fabrication of an FET sensor, according to an embodiment.
FIG. 13b is a schematic cross-section through an intermediate structure related to the fabrication of an FET sensor, according to an embodiment.

We now refer to FIGS. 13a-b. The initial steps in the fabrication process are similar to those described in example 3 with respect to FIGS. 1a to 3b and FIGS. 11a-b; differing therefrom in that a second sacrificial element (320) (e.g. amorphous silicon or $Si_3N_4$) is provided after the first sacrificial element (310) (FIG. 2) is provided, overlaying the first sacrificial element (310). This may, for example, be achieved by depositing a layer of the first sacrificial element (310), depositing a layer of the second sacrificial element (320) and then lithographically patterning both. Alternatively, the first sacrificial element (310) may be fully formed before providing the second sacrificial element (320).

Figures 14A, 14B:
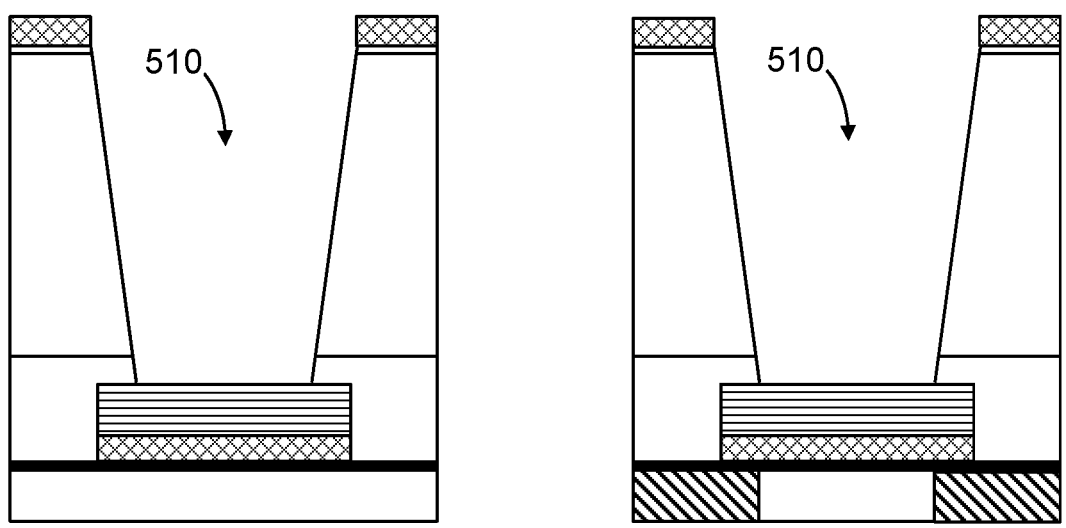
FIG. 14a is a schematic cross-section through an intermediate structure related to the fabrication of an FET sensor, according to an embodiment.
FIG. 14b is a schematic cross-section through an intermediate structure related to the fabrication of an FET sensor, according to an embodiment.

We now refer to FIGS. 14a-b. An opening is made in the mask (600) layer, e.g. using plasma-based etching. Subsequently, an access (510) to the second sacrificial element (320) is formed by etching (e.g. by dry etching), using the mask (600), the opening further down through the plurality of additional layers (400). The etching may be a relatively aggressive etching, capable of etching through a thickness of several hundred nanometers of the additional layers (400) in a relatively short time. The second sacrificial element (320) may act as an etch stop layer for the etching.

Figure 15A:
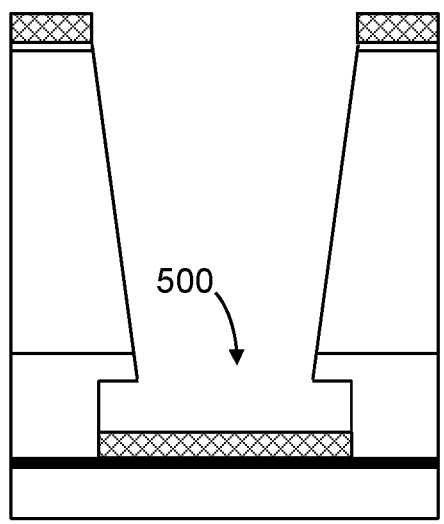
FIG. 15a is a schematic cross-section through an intermediate structure related to the fabrication of an FET sensor, according to an embodiment.
Figure 15B:
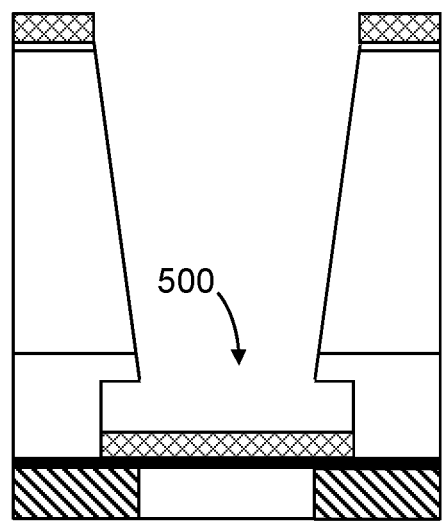
FIG. 15b is a schematic cross-section through an intermediate structure related to the fabrication of an FET sensor, according to an embodiment.

We now refer to FIGS. 15a-b. An access (500) to the first sacrificial element (310) is formed by removing the second sacrificial element (320), using phosphoric acid, TMAH or a dry etch; the intermediate (100) is thereby formed.

Figure 16A:
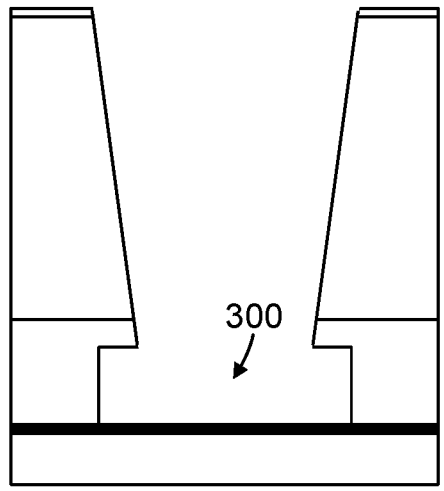
FIG. 16a is a schematic cross-section through an intermediate structure related to the fabrication of an FET sensor, according to an embodiment.
Figure 16B:
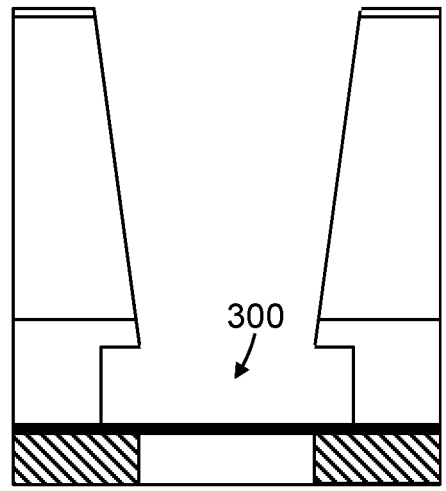
FIG. 16b is a schematic cross-section through an intermediate structure related to the fabrication of an FET sensor, according to an embodiment.

We now refer to FIGS. 16a-b. The first sacrificial element (310) is selectively removed by oxidation to open up the sensor cavity (300) over the substrate region (210); the mask (600) is thereby simultaneously removed. The selective oxidative removal may, for example, comprise the use of a peroxide (e.g. an aqueous solution of 20 wt % hydrogen peroxide) or an oxygen-based plasma. In some embodiments, the first sacrificial element (310) and mask (600) are removed at the end of the FET sensor fabrication, e.g. shortly before use of the sensor.

Example 5: Fabrication of a Field-Effect Transistor Sensor Using the Further Sacrificial Element (310) for Forming a Fluidic Channel (700)

Example 5 is a variation on example 4, wherein the further sacrificial element (310) is used to form a fluidic channel (700).

We now refer to FIGS. 17a-b. The initial steps in the fabrication process are similar to those described in example 4 with respect to FIGS. 1a to 3c and FIGS. 11a to 13b; the difference being that the second (and optionally first) sacrificial element (310) is larger and defines a volume that will form a fluidic channel (700) (e.g. a microfluidic channel (700)) in the intermediate (100).

We now refer to FIG. 18. An opening is made in the mask (600) layer, e.g. using a plasma-based etching. Subsequently, an access (510) to the second sacrificial element (320) is formed by etching (e.g. by dry etching), using the mask (600), opening further down through the plurality of additional layers (400). The etching may be a relatively aggressive etching, capable of etching through a thickness of several hundred nanometers of the additional layers (400) in a relatively short time. The second sacrificial element (320) may act as an etch stop layer for the etching.

We now refer to FIGS. 19a-b. An access (500) to the first sacrificial element (310) is formed by removing the second sacrificial element (320), using phosphoric acid, TMAH or a dry etch, simultaneously opening up the microfluidic channel (700). The intermediate (100) is thereby formed.

We now refer to FIGS. 20a-b. The first sacrificial element (310) is selectively removed by oxidation to open up the sensor cavity (300) over the substrate region (210); the mask (600) is thereby simultaneously removed. The selective oxidative removal may, for example, comprise the use of a peroxide (e.g. an aqueous solution of 20 wt % hydrogen peroxide) or an oxygen-based plasma. In some embodiments, the first sacrificial element (310) and mask (600) are removed at the end of the FET sensor fabrication, e.g. shortly before use of the sensor.

Figure 21:
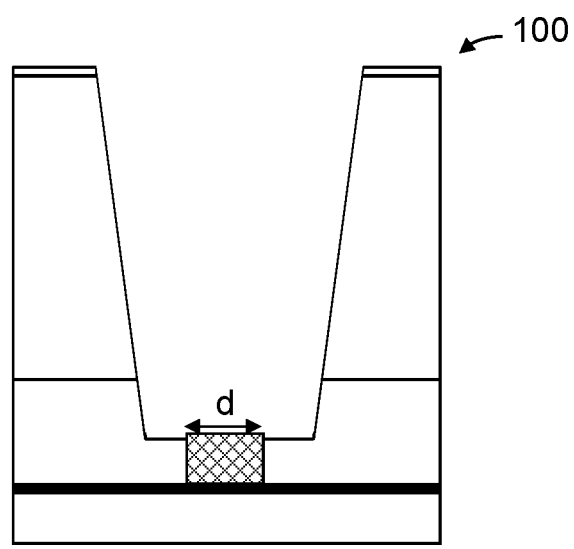
FIG. 21 is a schematic cross-section through an intermediate structure related to the fabrication of an FET sensor, according to an embodiment.

Example 6: Fabrication of a Field-Effect Transistor Sensor by Using an Access of Larger Lateral Dimension than the Corresponding Dimension of the Sensor Cavity We now refer to FIG. 21. Example 1 is repeated except that the sensor cavity (300) has its smallest lateral dimension (d) measuring at most 100 nm and wherein the access (500) has a dimension (d'), in the direction of the smallest lateral dimension of the cavity, larger than the smallest lateral dimension of the cavity.

While examples 2 to 5 have been described as distinct variations on examples 1 or 3, it will be clear that these variations can in embodiments easily be combined. For example, an embodiment in accordance with example 1 may comprise a nanocavity (212) in accordance with example 2, and/or the use of a mask (600) in accordance with example 3, and/or the use of a further sacrificial element (310) in accordance with example 4, and/or a fluidic channel (700) in accordance with example 5.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for forming a field-effect transistor sensor, the method comprising:
providing a substrate having a substrate region comprising a gate dielectric,
providing a sacrificial element over the substrate region,
providing one or more layers having a combined thickness perpendicular to the substrate of at least 100 nm over the sacrificial element,
opening an access to the sacrificial element through the one or more layers, wherein the sacrificial element extends beyond the access in a direction that is parallel to the substrate, and
removing the sacrificial element, thereby opening a sensor cavity over the substrate region, wherein removing the sacrificial element comprises removing the sacrificial element via oxidative removal, wherein the sacrificial element comprises a carbon-based material and wherein the oxidative removal comprises an oxygen-based plasma etching.

2. The method according to claim 1, wherein the sensor cavity has its smallest lateral dimension measuring at most 100 nm, and wherein the access has a dimension, in the direction of the smallest lateral dimension of the sensor cavity, larger than the smallest lateral dimension of the sensor cavity.

3. The method according to claim 1, wherein removing the sacrificial element comprises selectively removing the sacrificial element with respect to an exposed material comprising Al, $Al_2O_3$, Ti, or $Ti_xO_y$.

4. The method of claim 1, wherein the oxidative removal comprises contacting the sacrificial element with a peroxide solution.

5. The method according to claim 1, wherein opening the access comprises using a mask that is removable via removal of the sacrificial element.

6. The method of claim 1, wherein the substrate region comprises a nanocavity.

7. The method according to claim 1, wherein the sacrificial element comprises a metal.

8. The method according to claim 7, wherein the metal comprises one or more of TiN, W, or TaN.

9. The method according to claim 1, wherein the one or more layers have a combined thickness of at least 500 nm.

10. The method according to claim 1, wherein the one or more layers have a combined thickness of at least 1 µm.

11. The method according to claim 1, further comprising:
providing a further sacrificial element over the sacrificial element, and
removing the further sacrificial element.

12. The method according to claim 11, further comprising forming a fluidic channel by removing the further sacrificial element.

13. A field-effect transistor (FET) obtained by a method comprising:
providing a substrate having a substrate region comprising a gate dielectric,
providing a sacrificial element over the substrate region,
providing one or more layers having a combined thickness perpendicular to the substrate of at least 100 nm over the sacrificial element,
opening an access to the sacrificial element through the one or more layers, wherein the sacrificial element extends beyond the access in a direction that is parallel to the substrate, and
removing the sacrificial element, thereby opening a sensor cavity over the substrate region, wherein removing the sacrificial element comprises removing the sacrificial element via oxidative removal, wherein the sacrificial element comprises a carbon-based material and wherein the oxidative removal comprises an oxygen-based plasma etching.

14. The FET according to claim 13, wherein the sacrificial element further comprises a metal.

15. The FET according to claim 13, further comprising an exposed material comprising one or more of Al, $Al_2O_3$, Ti or $Ti_xO_y$, and wherein the sacrificial element is selectively removable by oxidation with respect to the exposed material.

16. The FET according to claim 13, further comprising a fluidic channel, the fluidic channel being filled with a further sacrificial element.

* * * * *